(12) United States Patent
Sutton

(10) Patent No.: US 10,112,549 B2
(45) Date of Patent: Oct. 30, 2018

(54) VEHICLE LADDER MOUNTING SYSTEM FOR CUSTOM INSTALLATIONS

(71) Applicant: Jeffery Wayne Sutton, Oklahoma City, OK (US)

(72) Inventor: Jeffery Wayne Sutton, Oklahoma City, OK (US)

(*) Notice: Subject to any disclaimer, the term of this patent is extended or adjusted under 35 U.S.C. 154(b) by 0 days.

(21) Appl. No.: 13/868,081

(22) Filed: Apr. 22, 2013

(65) Prior Publication Data

US 2013/0291362 A1    Nov. 7, 2013

Related U.S. Application Data

(60) Continuation-in-part of application No. 13/486,607, filed on Jun. 1, 2012, now abandoned, which is a division of application No. 11/691,450, filed on Mar. 26, 2007, now Pat. No. 8,205,717.

(60) Provisional application No. 60/743,778, filed on Mar. 25, 2006.

(51) Int. Cl.
| | |
|---|---|
| *B60R 9/042* | (2006.01) |
| *B60R 11/00* | (2006.01) |
| *B60R 9/048* | (2006.01) |
| *E06C 5/02* | (2006.01) |
| *E06C 5/24* | (2006.01) |

(52) U.S. Cl.
CPC ............ *B60R 11/00* (2013.01); *B60R 9/0423* (2013.01); *B60R 9/0485* (2013.01); *E06C 5/02* (2013.01); *E06C 5/24* (2013.01); *Y10T 29/49826* (2015.01)

(58) Field of Classification Search
CPC .............................. B60R 9/0423; B60R 9/042
See application file for complete search history.

(56) References Cited

U.S. PATENT DOCUMENTS

| | | | | | |
|---|---|---|---|---|---|
| 2,765,940 | A | * | 10/1956 | Nelson | 414/462 |
| 3,193,124 | A | * | 7/1965 | Essling | B60P 3/1025 224/310 |
| 3,836,058 | A | * | 9/1974 | Penniman | B60R 9/12 211/70.5 |
| 4,498,545 | A | * | 2/1985 | Grassi | B23P 19/06 173/190 |

(Continued)

FOREIGN PATENT DOCUMENTS

| | | | |
|---|---|---|---|
| DE | 4338609 A1 | * | 5/1995 |
| DE | 19630846 C1 | * | 12/1997 |

(Continued)

*Primary Examiner* — Alvin C Chin-Shue
(74) *Attorney, Agent, or Firm* — Martin S. High, P.C.

(57) ABSTRACT

The Vehicle Ladder Mounting System is comprised of two parallel or nearly parallel (angled) guide rails and one or two end accepting means. The embodiments of the Ladder Mounting System can be easily adapted, augmented, and modified because of the structure of the guide rails (or aluminum channels in the guide rails). The vehicle ladder mounting system can be mounted to a tubular or solid cross-member by a clamping means using a universal mounting clamp. The design of the embodiments of the Ladder Mounting System allows for multiple configurations as the guide rails can be adjusted to fit the width and/or angle of the ladder. The design of the embodiments of the Ladder Mounting System allows the width and/or angle to be fixed by means of the use of interior cross-member assemblies thus forming a cradle to support the ladder.

2 Claims, 19 Drawing Sheets

(56) References Cited

U.S. PATENT DOCUMENTS

| | | | | |
|---|---|---|---|---|
| 5,469,933 A | * | 11/1995 | Thomason | 182/127 |
| 5,690,259 A | * | 11/1997 | Montani | B60R 9/10 |
| | | | | 224/310 |
| 5,904,463 A | * | 5/1999 | Christensen | 414/462 |
| 6,164,507 A | * | 12/2000 | Dean | B60R 9/08 |
| | | | | 224/319 |
| 2002/0113346 A1 | * | 8/2002 | Constantinescu | A47C 23/02 |
| | | | | 267/36.1 |
| 2008/0257138 A1 | * | 10/2008 | Walker | F42D 3/04 |
| | | | | 86/50 |
| 2013/0200120 A1 | * | 8/2013 | Levi | 224/309 |

FOREIGN PATENT DOCUMENTS

| | | | |
|---|---|---|---|
| DE | 102005011483 A1 | * | 8/2006 |
| FR | 2684341 A1 | * | 6/1993 |

\* cited by examiner

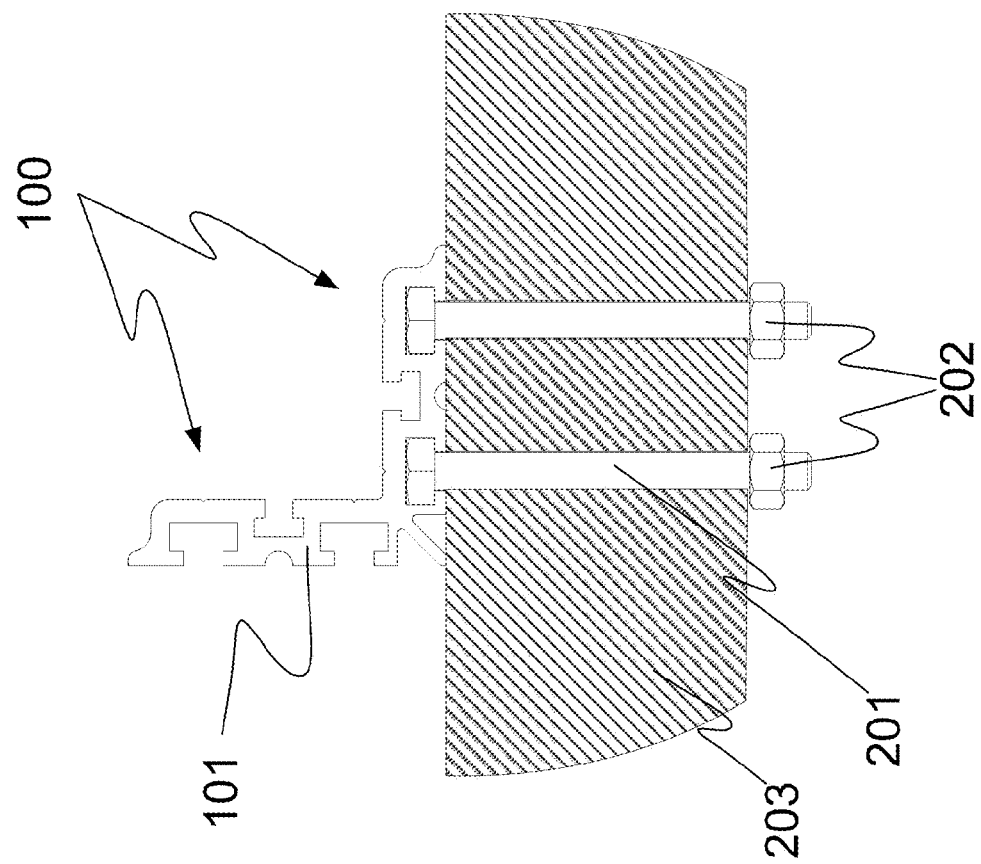

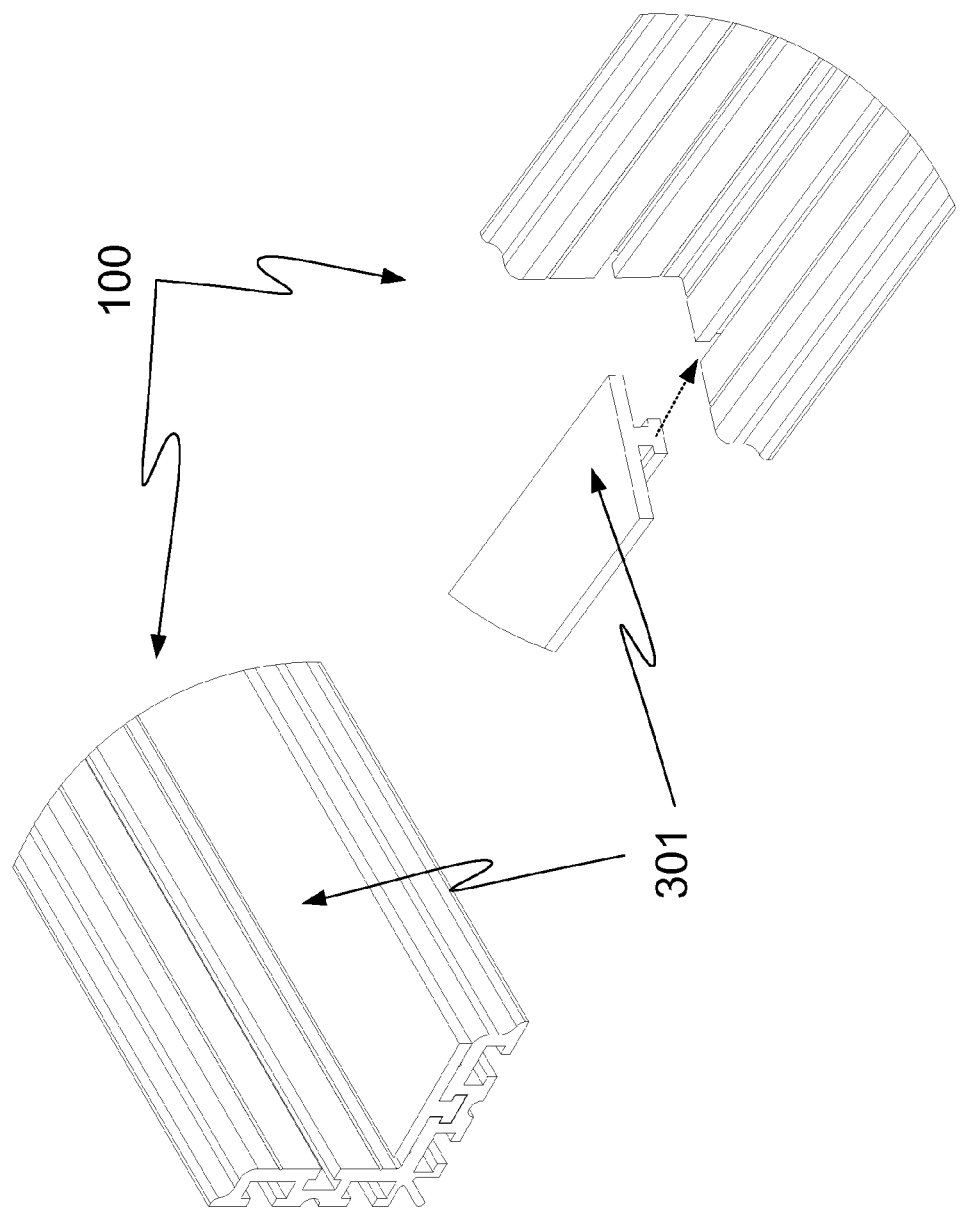

100

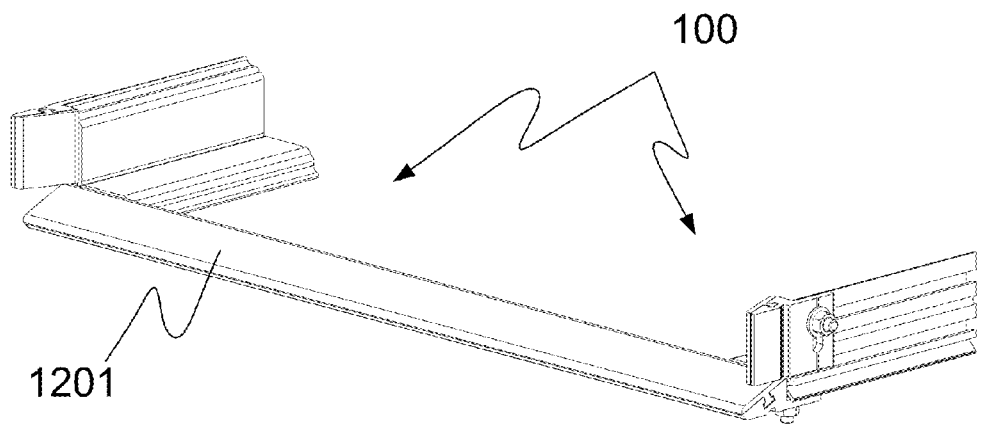
FIG 12A
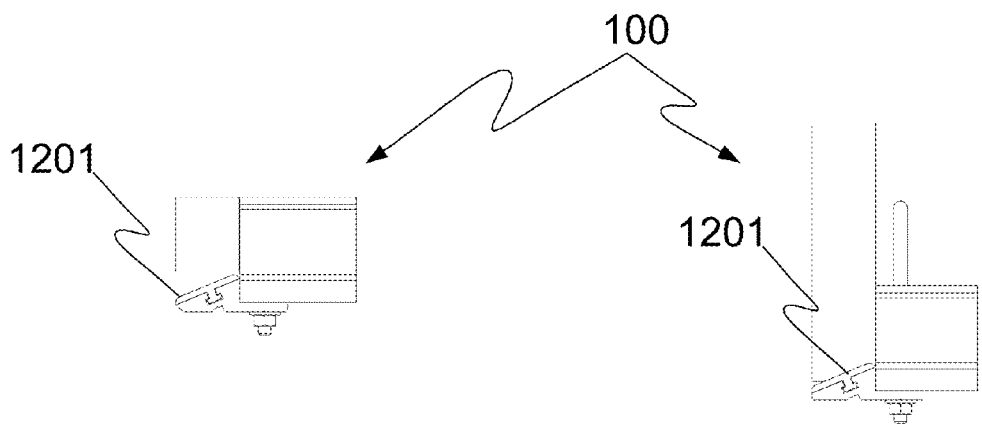
FIG 12B  FIG 12C

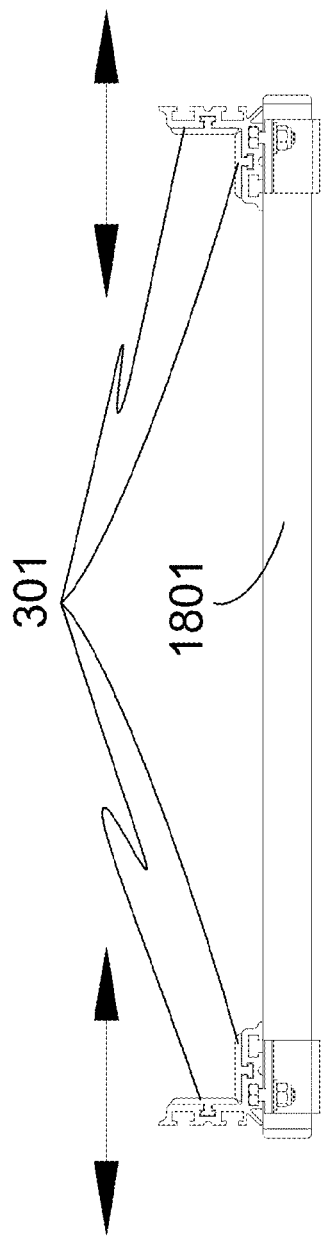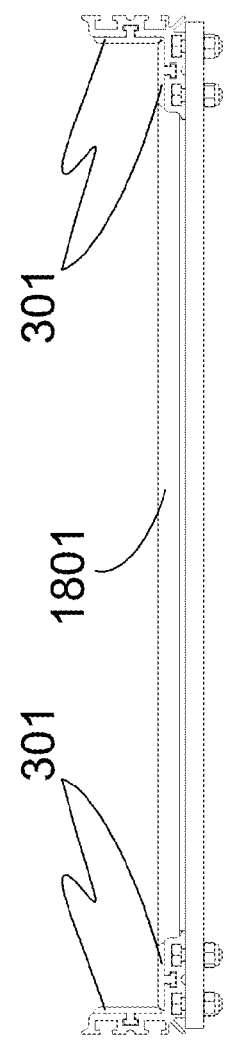

VEHICLE LADDER MOUNTING SYSTEM FOR CUSTOM INSTALLATIONS

CROSS-REFERENCE TO RELATED APPLICATIONS

This application is a continuation-in-part of U.S. Utility application Ser. No. 13/486,607, filed on Jun. 1, 2012, now pending. U.S. Utility application Ser. No. 13/486,607 is a divisional application of U.S. Utility application Ser. No. 11/691,450, filed on Mar. 26, 2007, issued as U.S. Pat. No. 8,205,717 on Jun. 26, 2012. U.S. Utility application Ser. No. 11/691,450 claims benefit of U.S. Provisional Application No. 60/743,778, filed on Mar. 25, 2006. This application claims benefit of U.S. Utility application Ser. Nos. 13/486,607 and 11/691,450 and U.S. Provisional Application No. 60/743,778. U.S. Utility application Ser. Nos. 13/486,607 and 11/691,450, and U.S. Provisional Patent Application No. 60/743,778 are incorporated by reference in their entirety for all purposes as if fully set forth herein.

STATEMENT REGARDING FEDERALLY SPONSORED RESEARCH OR DEVELOPMENT

Not applicable.

REFERENCE TO A "SEQUENCE LISTING," A TABLE, OR A COMPUTER PROGRAM LISTING

Not applicable.

BACKGROUND OF THE EMBODIMENTS

Field of Embodiments

The field of the embodiments of the Vehicle Ladder Mounting System for Custom Installations generally involves the support of objects on top of vehicles and more specifically the support of ladders on vehicles.

Description of Prior Art

The prior art involves the support means mounted to the bed, top or sides of vans, pickup or utility trucks for ladders. The support means can be as rudimentary as a bracket mounted to the truck in which the ladder rests on the truck. The support means can also comprise a metal frame installed onto the truck bed or top of a van.

There are many drawbacks to the current state of the art in ladder support devices. Most significantly, current inventions do not allow for the ability to easily guide a ladder onto and off of a preexisting vehicle ladder rack or roof rack and preventing the ladder from shifting as the vehicle is in motion. The current state of the art does not allow for a wide variety of configurations for accepting varying types of ladders. Further, current inventions do not allow for the easy attachment of guide rails to the support devices. The embodiments of the Vehicle Ladder Mounting System for Custom Installations addresses these concerns.

BRIEF SUMMARY OF THE EMBODIMENTS

Embodiments of the Vehicle Ladder Mounting System, are comprised of a guide rail assembly, a plurality of support assemblies and one or more end accepting means. The guide rail assembly of the embodiments of the Vehicle Ladder Mounting System for Custom Installations is comprised of two parallel or near parallel (angled) guide rails connected by a one or more end accepting means, at one or both ends of the guide rails. Or in other words, the Vehicle Ladder Mounting System for Custom Installations is comprised of one or more end accepting means, at one or both ends of the guide rails and also may be connected by a plurality of interior cross-member assemblies." The embodiments of the Vehicle Ladder Mounting System for Custom Installations also comprises a guide rail design that allows for a wide variety of configurations to be made due to the plurality of square channels formed by the guide rails. The guide rails allow for flexible installation on a variety of surfaces and vehicles. The guide rails in particular allow for highly flexible assembly of a variety of configurations. The embodiments of the Vehicle Ladder Mounting System for Custom Installations can be easily adapted, augmented, and modified because of the structure of the aluminum channel. The design of the embodiments of the Vehicle Ladder Mounting System for Custom Installations allows for multiple configurations as the guide rail can be attached to a pre-existing cross-member in many configurations via a clamping or bolt-nut combination. Therefore, due to the flexibility of the rails nearly limitless configurations can be constructed.

This description, and the detailed description below, is not intended to limit the number of configurations of the embodiments of the Vehicle Ladder Mounting System for Custom Installations as the system to make these easily configurable arrangements is the embodiments of the Vehicle Ladder Mounting System for Custom Installations described herein, not merely the various configurations posed as examples.

One embodiment of the Vehicle Ladder Mounting System for Custom Installations is comprised of a clamping system which allows the Vehicle Ladder Mounting System to be mounted to any pre-existing ladder or roof rack made for vehicles by means of clamping to the racks cross-members by using a universal mounting clamp comprised of two clamping plates.

Depending on the application requirements of the embodiments of the Vehicle Ladder Mounting System for Custom Installations, various configurations of the guide rail systems can be attained to meet specific shape of the ladder to be carried on the user's ladder or roof rack. This is done by adjusting the guide rails to be parallel and spaced apart to a specified width, thus fitting the user's specific extension ladder.

There has thus been outlined, rather broadly, the more important features of the embodiments of the Vehicle Ladder Mounting System for Custom Installations in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the Vehicle Ladder Mounting System for Custom Installations in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relates from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

BRIEF DESCRIPTION OF THE SEVERAL VIEWS OF THE DRAWINGS OF THE EMBODIMENTS

FIG. 2 illustrates a cross-sectional view illustrating the attachment of a guide rail to any pre-existing cross-member by bolting directly through the cross-member.

FIG. 3A shows the shows the polymeric pad installed into a guide rail; FIG. 3B shows the installation of a polymeric pad into a guide rail and shows how the male slot formed by the polymeric pad is accepted by the female slot of a guide rail embodiment.

Figure 4A:
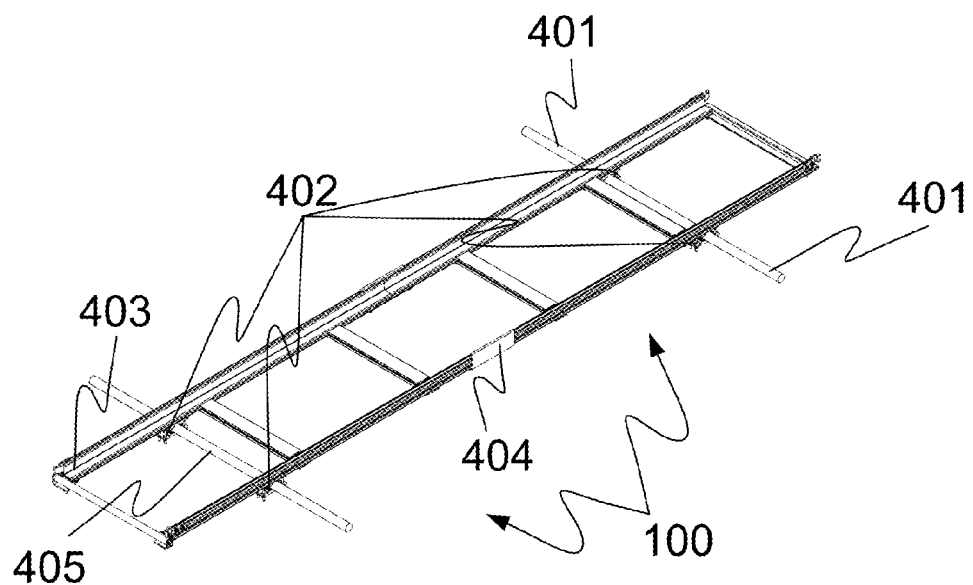
Figure 4B:
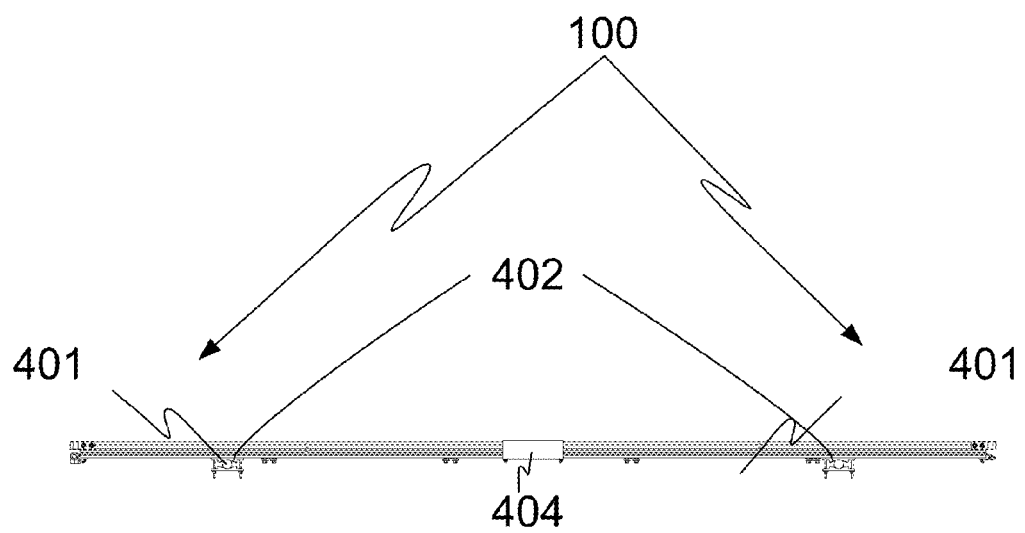

FIG. 4A is a perspective view of an embodiment of the vehicle ladder mounting system showing the attachment to pre-existing cross-members with the guide rails in the parallel position showing interior cross-member supports (cradles); FIG. 4B is a side view of an embodiment of a vehicle ladder mounting system showing the attachment to pre-existing cross-members with the guide rails in the parallel position.

Figure 5A:
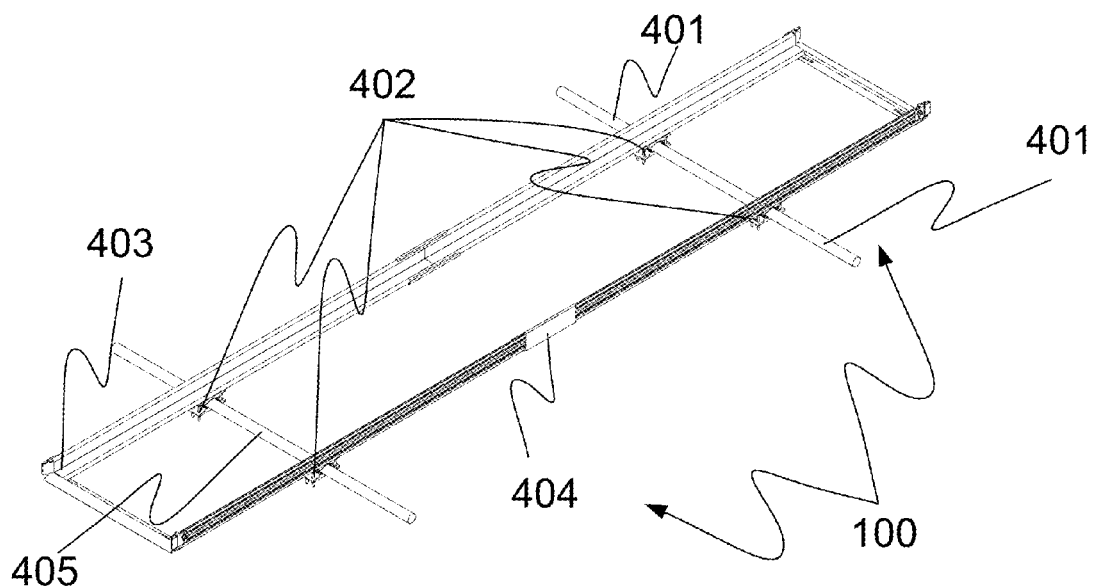
Figure 5B:
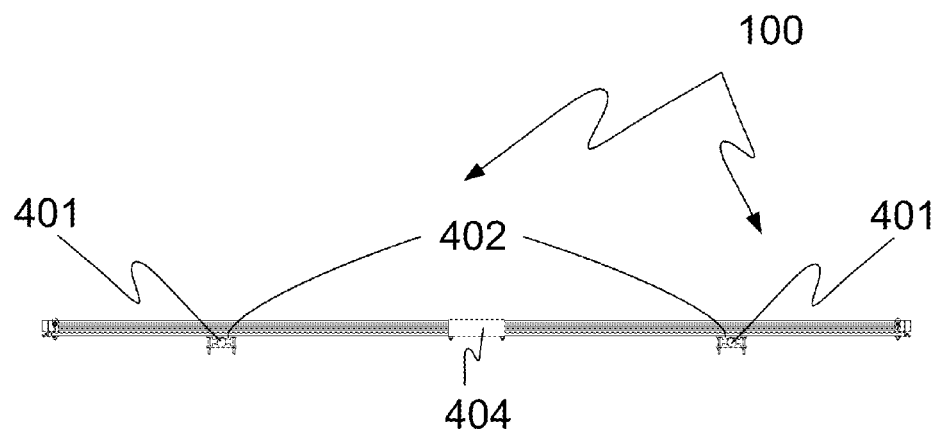

FIG. 5A is a perspective view of an embodiment of the vehicle ladder mounting system showing the attachment to pre-existing cross-members with the guide rails in the parallel position; FIG. 5B is a side view of an embodiment of a vehicle ladder mounting system showing the attachment to pre-existing cross-members with the guide rails in the parallel position.

Figure 6A:
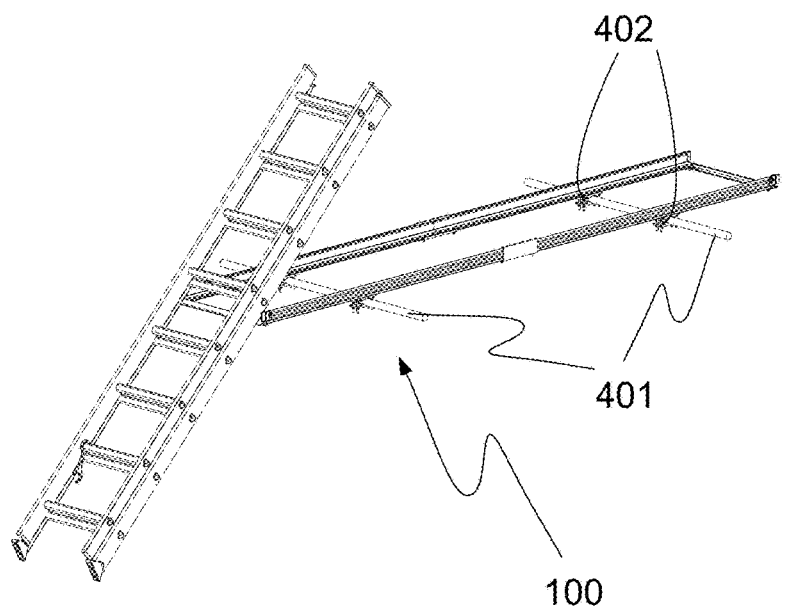
Figure 6B:
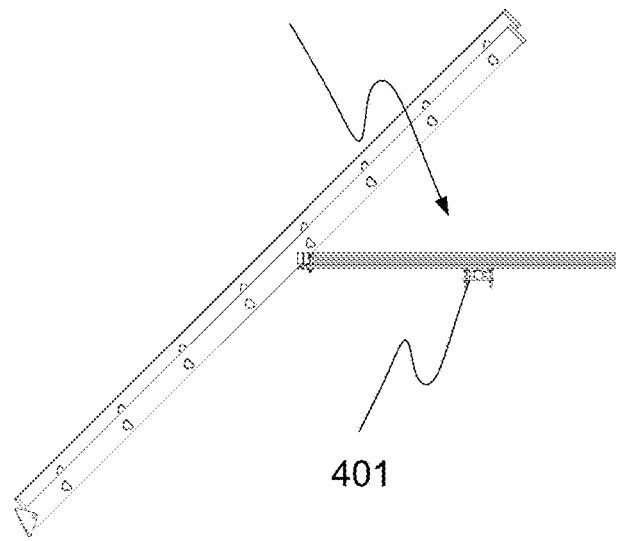

FIG. 6A is a perspective view of an embodiment of the vehicle ladder mounting system showing the acceptance of a step ladder into the guide rails; FIG. 6B is a side view of an embodiment of the vehicle ladder mounting system showing the acceptance of an extension ladder into the guide rails.

Figure 7A:
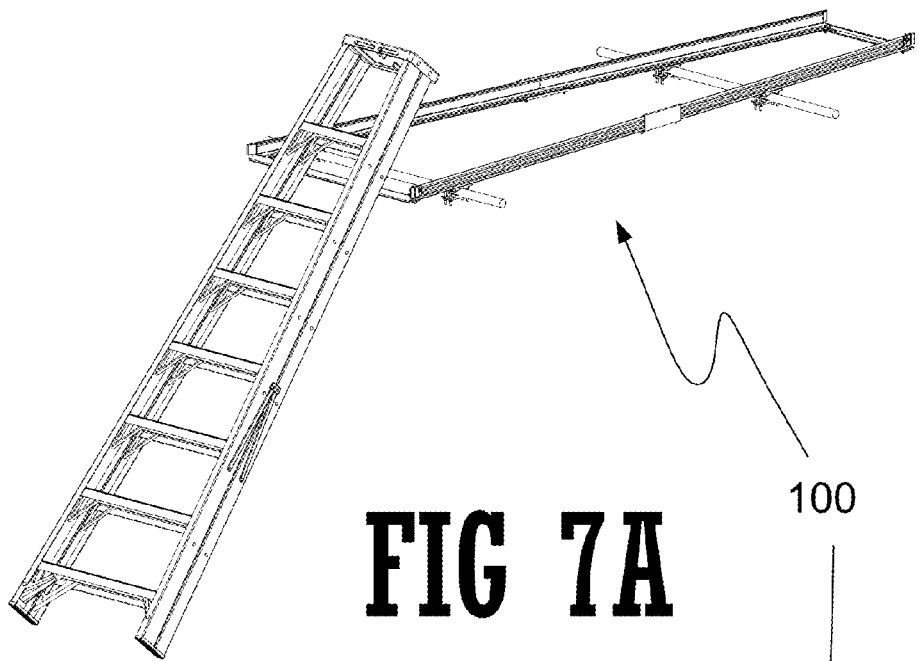
Figure 7B:
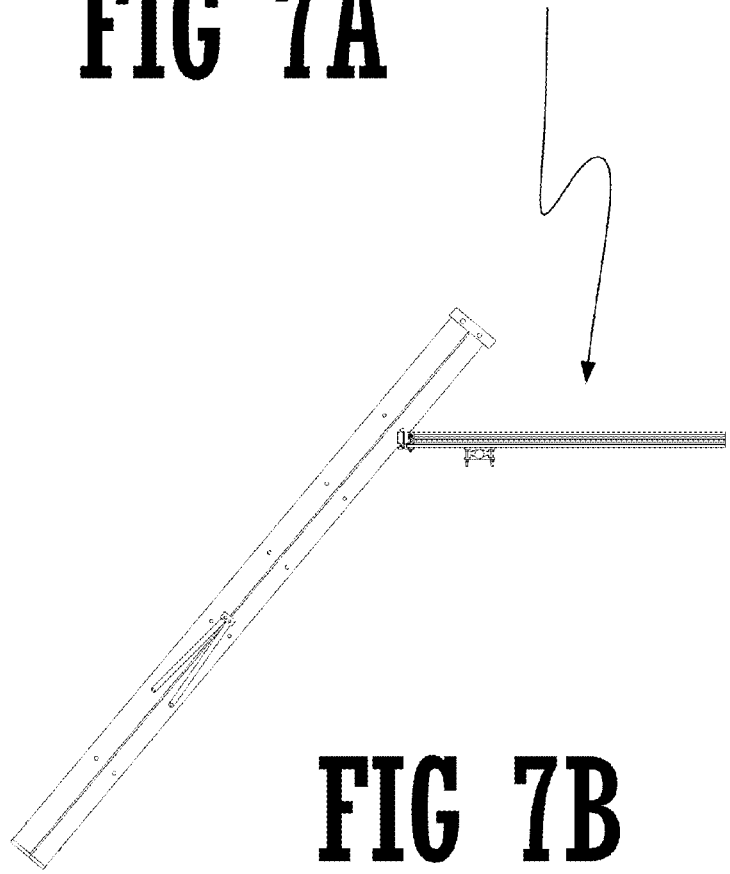

FIG. 7A is a perspective view of an embodiment of the vehicle ladder mounting system showing the acceptance of a step ladder into the guide rails; FIG. 7B is a side view of an embodiment of the vehicle ladder mounting system showing the acceptance of a step ladder into the guide rails.

Figure 8A:
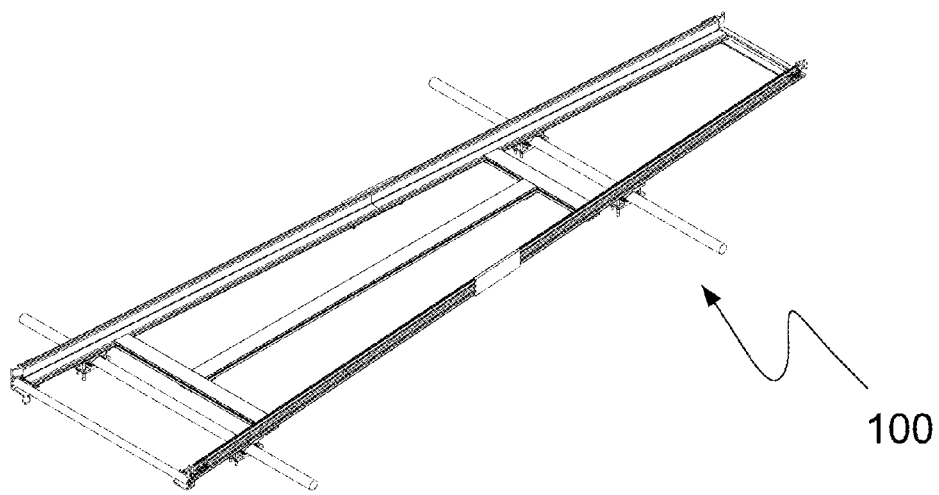
Figure 8B:
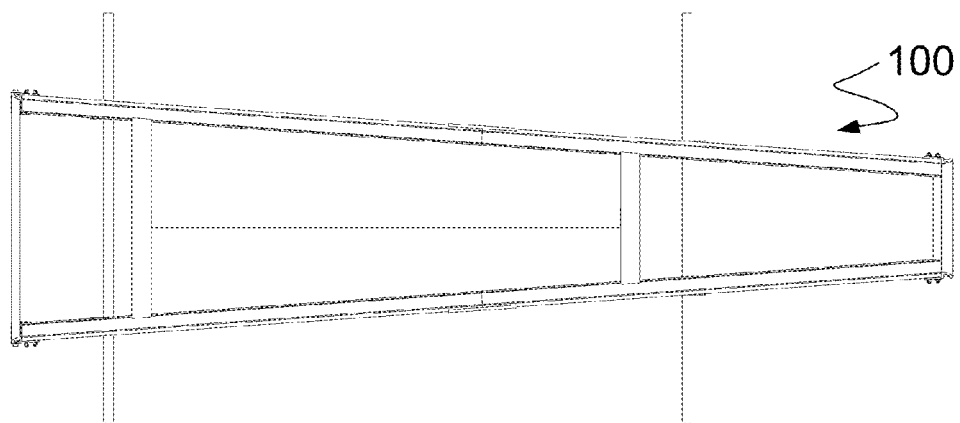
Figure 8C:
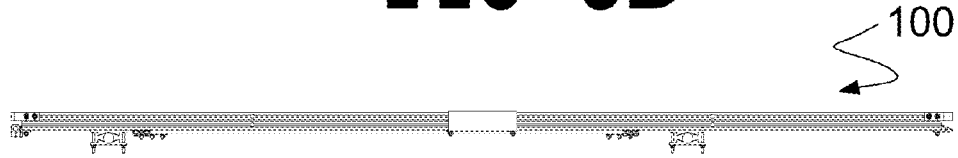

FIG. 8A is a perspective view of an embodiment of a vehicle ladder mounting system showing the attachment to pre-existing cross-members with the guide rails in the nearly parallel (angled) position showing interior cross-member supports (cradles); FIG. 8B is top view of an embodiment of the vehicle ladder mounting system showing the attachment to pre-existing cross-members with the guide rails in the nearly parallel (angled) position; FIG. 8C is side view of an embodiment of the vehicle ladder mounting system showing the attachment to pre-existing cross-members with the guide rails in the nearly parallel (angled) position.

Figure 9A:
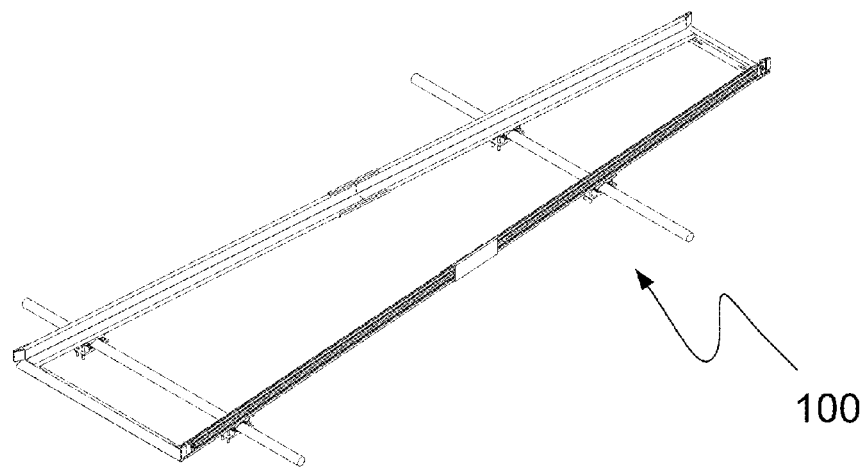
Figure 9B:
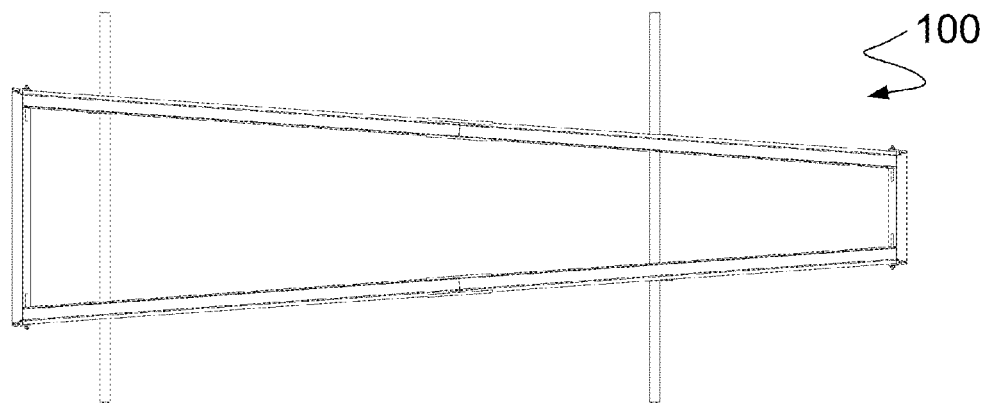
Figure 9C:
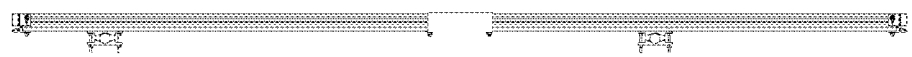

FIG. 9A is a perspective view of an embodiment of a vehicle ladder mounting system showing the attachment to pre-existing cross-members with the guide rails in the nearly parallel (angled) position; FIG. 9B is top view of an embodiment of the vehicle ladder mounting system showing the attachment to pre-existing cross-members with the guide rails in the nearly parallel (angled) position; FIG. 9C is side view of an embodiment of the vehicle ladder mounting system.

Figure 10A:
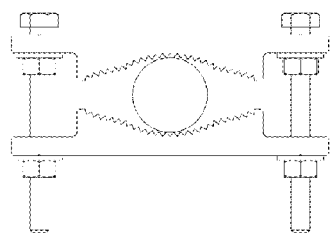
Figure 10B:
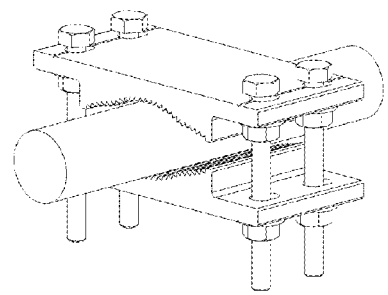
Figure 10C:
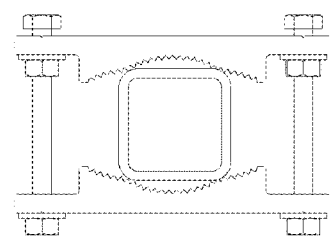
Figure 10D:
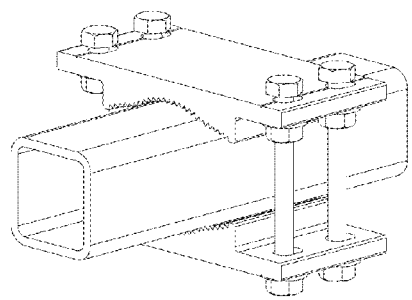
Figure 10E:
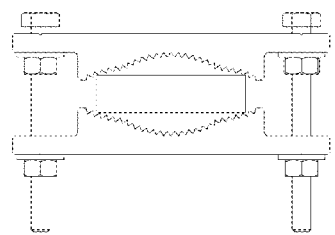
Figure 10F:
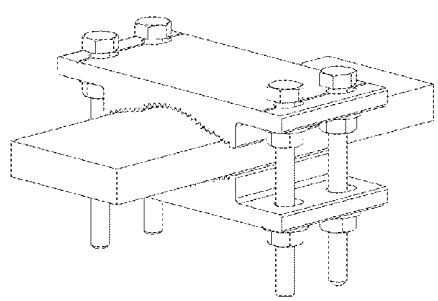

FIG. 10A is a front view of an embodiment of the vehicle ladder mounting system showing how the universal mounting clamp engages a round cross-member; FIG. 10B is a perspective view of an embodiment of the vehicle ladder mounting system showing how the universal mounting clamp engages a round cross-member; FIG. 10C is a front view of an embodiment of the vehicle ladder mounting system showing how the universal mounting clamp engages a square cross-member; FIG. 10D is a perspective view of an embodiment of the vehicle ladder mounting system showing how the universal mounting clamp engages a square cross-member; FIG. 10E is a front view of an embodiment of the vehicle ladder mounting system showing how the universal mounting clamp engages a rectangular cross-member; FIG. 10F is a perspective view of an embodiment of the vehicle ladder mounting system showing how the universal mounting clamp engages a rectangular cross-member.

Figure 11A:
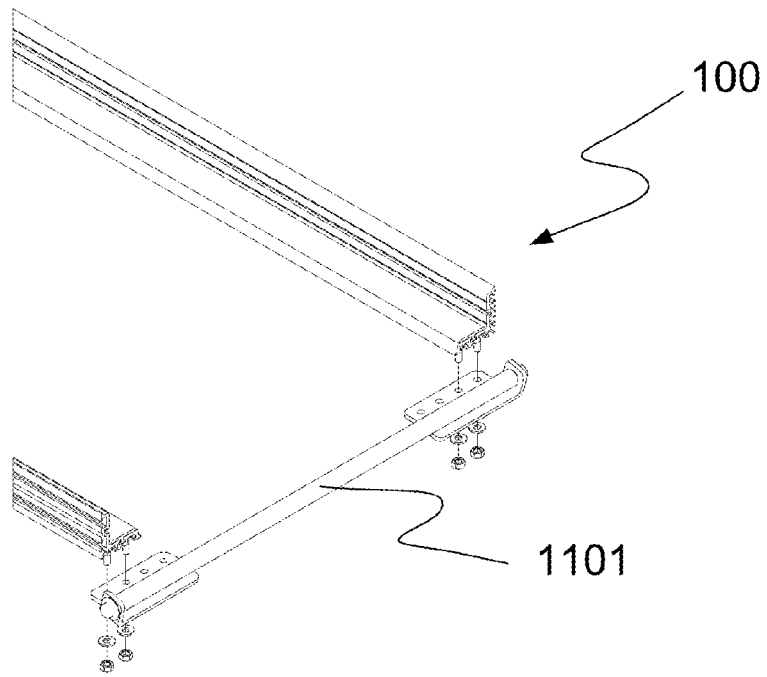
Figure 11B:
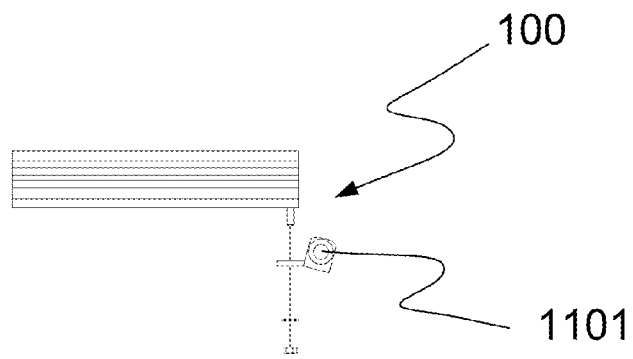

FIG. 11A is a perspective view of an embodiment of the vehicle ladder mounting system showing an end accepting means, a roller end cap, terminating an end of the vehicle ladder mounting system; FIG. 11B is a side view of an embodiment of the vehicle ladder mounting system showing an end accepting means, a roller end cap, terminating an end of the vehicle ladder mounting system.

FIG. 12A is a perspective view of an embodiment of the vehicle ladder mounting system showing an end accepting means, an aluminum and/or polymeric end cap, terminating an end of the vehicle ladder mounting system along with an aluminum and/or polymeric edge guard on the vertical wall of the guide rail; FIG. 12B is a side view of an embodiment of the vehicle ladder mounting system showing an end accepting means, an aluminum and/or polymeric end cap, terminating an end of the vehicle ladder mounting system along with an aluminum and/or polymeric edge guard on the vertical wall of the guide rail; FIG. 12C is a side view of an embodiment of the vehicle ladder mounting system showing an end accepting means, an aluminum and/or polymeric end cap, terminating an end of the vehicle ladder mounting system along with an aluminum and/or polymeric edge guard on the vertical wall of the guide rail.

Figure 13A:
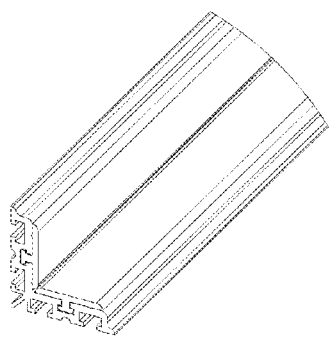
Figure 13B:
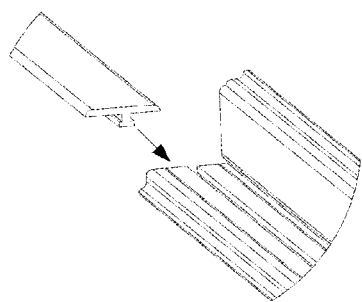

FIG. 13A is a perspective view of an embodiment of the vehicle ladder mounting system showing a polymeric slip pad engaged on both the vertical and horizontal interior walls of the guide rail; FIG. 13B is a side view of an embodiment of the vehicle ladder mounting system showing a polymeric slip pad being engaged on either or both the vertical and horizontal interior walls of the guide rail.

Figure 14A:
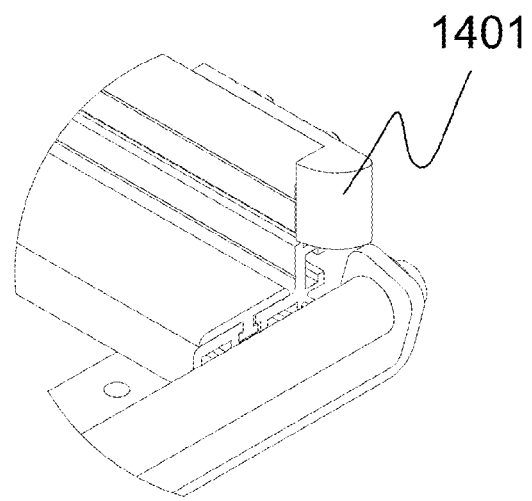
Figure 14B:
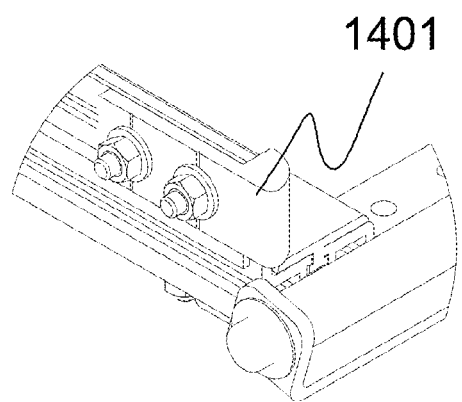

FIG. 14A is a perspective view of an embodiment of the vehicle ladder mounting system showing the end of a guide rail where an alternative aluminum and/or polymeric edge guard engaged in a guide rail; FIG. 14B is the opposite perspective view of an embodiment of the vehicle ladder mounting system showing the end of a guide rail where an alternative aluminum and/or polymeric edge guard engaged in a guide rail.

Figure 15A:
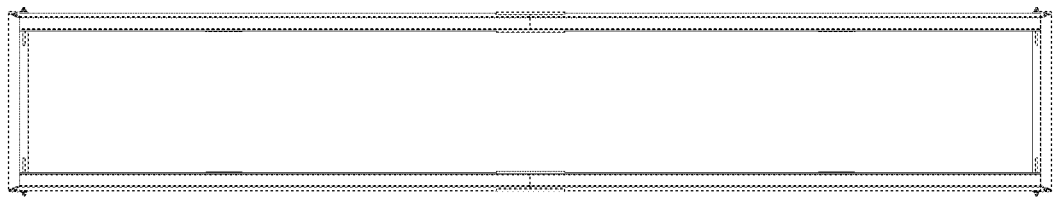
Figure 15B:
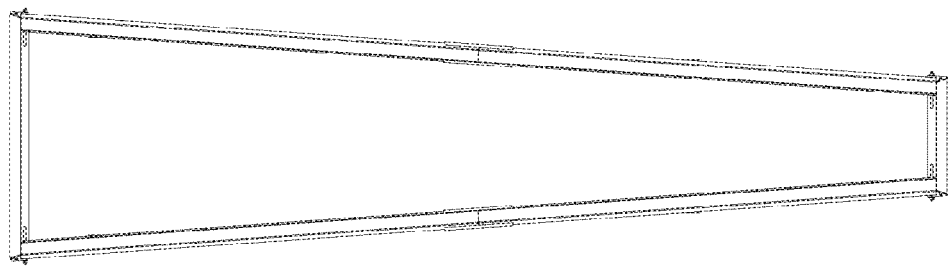

FIG. 15A is a top view of an embodiment of the vehicle ladder mounting system without pre-existing or interior cross-members showing a ladder rack in an orientation for accepting an extension ladder with the guide rails in the parallel position allowing the guide rails to be adjusted to fit the width of the ladder along with the adjustable end accepting means; FIG. 15B is a top view of an embodiment of the vehicle ladder mounting system without pre-existing cross-members or interior cross-members showing a ladder rack in an orientation for accepting a step ladder with the guide rails in the nearly parallel (angled) position allowing the guide rails to be adjusted to fit the width of the ladder along with the adjustable end accepting means.

Figure 16A:
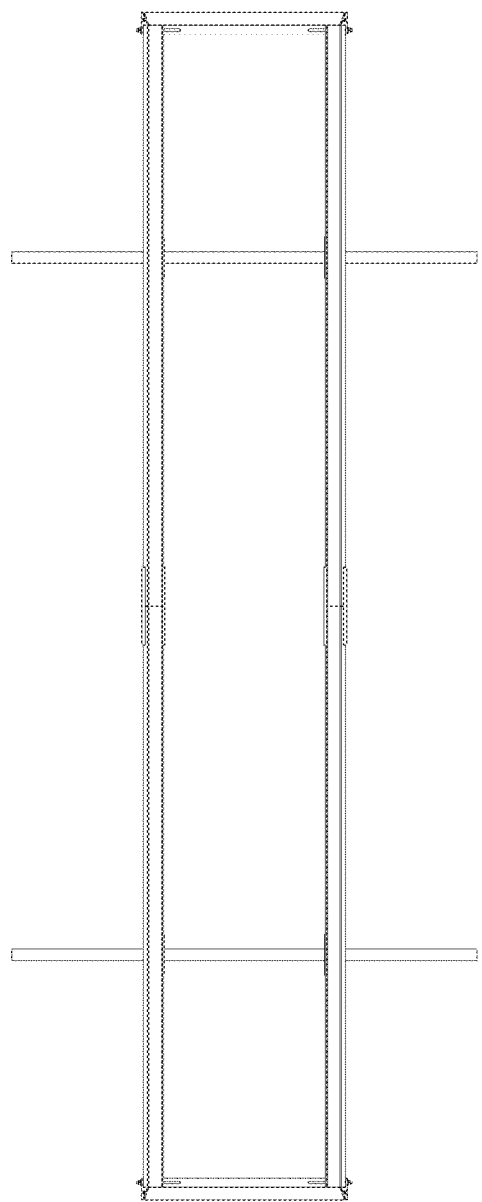
Figure 16B:
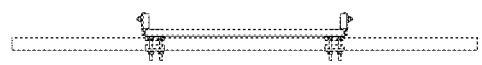

FIG. 16A is a top view of an embodiment of the vehicle ladder mounting system showing a ladder rack affixed to pre-existing cross-members but without interior cross-members showing a ladder rack in an orientation for accepting an extension ladder with the guide rails in the parallel position allowing the guide rails to be adjusted to fit the width of the ladder along with the adjustable end accepting means; FIG. 16B is a side view of an embodiment of the vehicle ladder mounting system showing a ladder rack affixed to pre-existing cross-members but without interior cross-members showing a ladder rack in an orientation for accepting an extension ladder with the guide rails in the parallel position allowing the guide rails to be adjusted to fit the width of the ladder along with the adjustable end accepting means.

Figure 17:
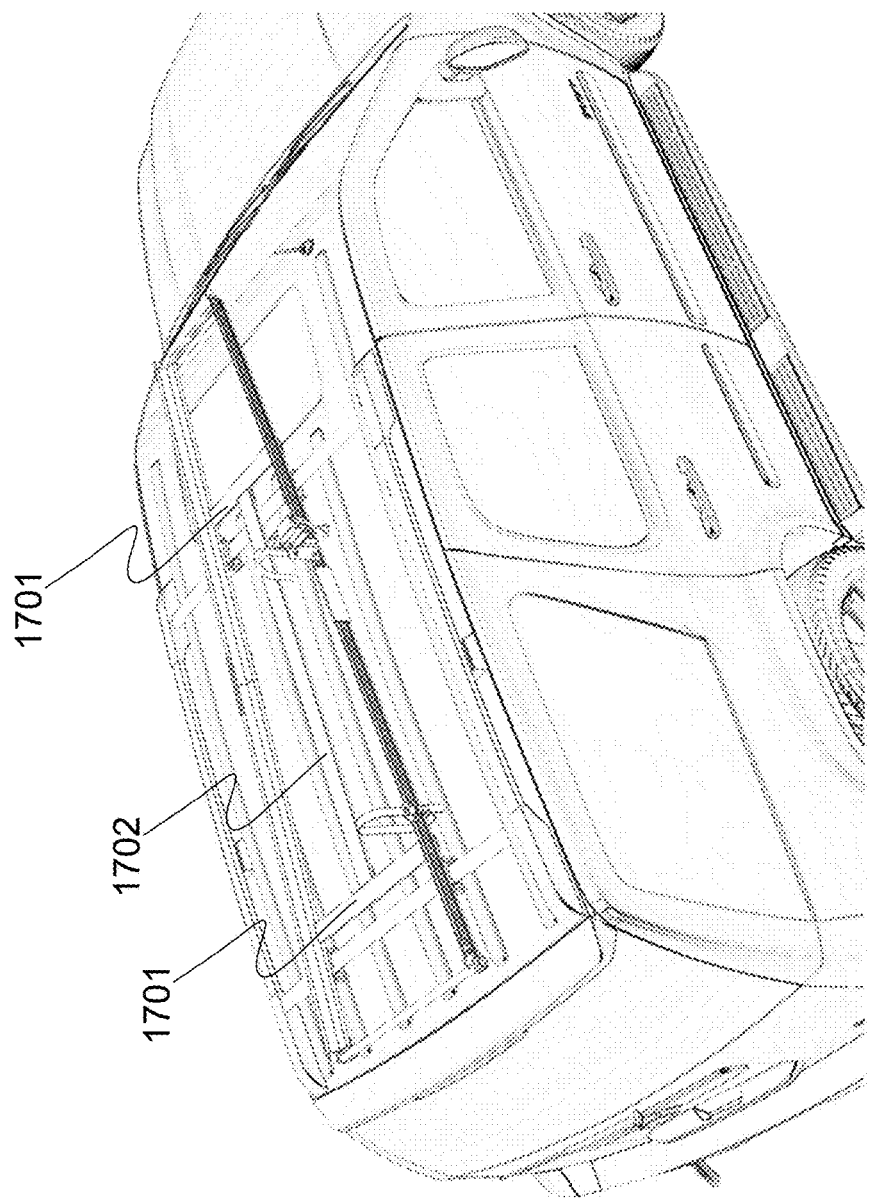

FIG. 17 is a perspective view of an embodiment of the vehicle ladder mounting system shown on a pre-existing roof rack on an SUV with interior cross-members with the guide rails in the nearly parallel (angled) position to accept a step ladder along with fixed end accepting means on both ends of the guide rails.

Figure 18A:
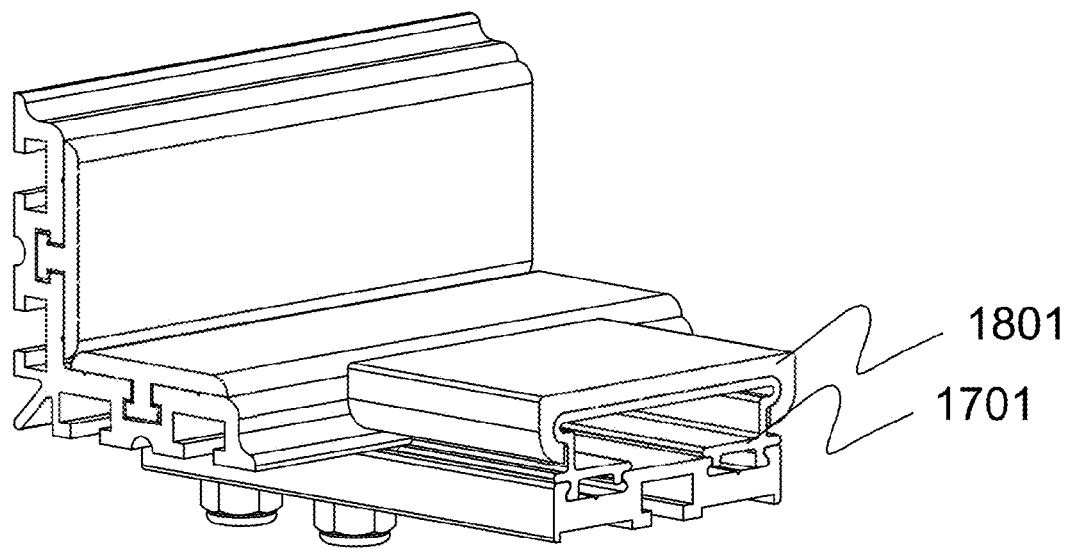
Figure 18B:
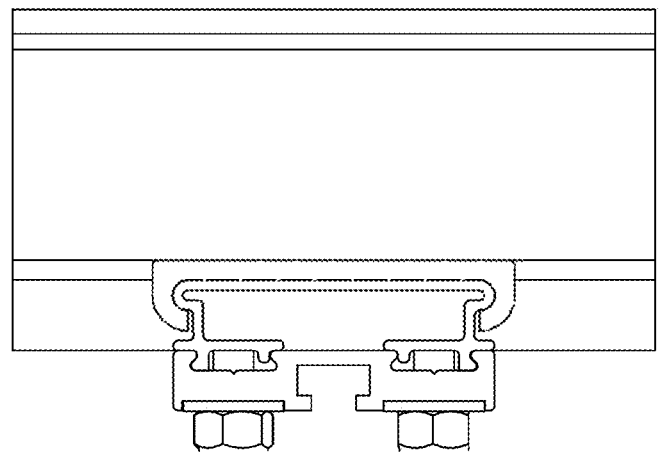

FIG. 18A is a perspective cross-sectional view of an embodiment of the vehicle ladder mounting system showing an interior cross-member attaching to a guide rail along with the polymeric pad on top of the interior cross-member. The interior cross-member supports (cradles) the ladder as it slides along the guide rails and affixes the two guide rails together. FIG. 18B is a cross-sectional side view of an embodiment of the vehicle ladder mounting system showing an interior cross-member attaching to a guide rail along with the polymeric pad on top of the interior cross-member. The interior cross-member supports (cradles) the ladder as it slides along the guide rails and affixes the two guide rails together.

FIG. 19A is a front view of an embodiment of the vehicle ladder mounting system showing how the universal mounting clamp can be adjusted to accommodate various widths of ladders by adjusting the guide rails closer together or further apart; FIG. 19B is a front view of an embodiment of the vehicle ladder mounting system showing how the guide rails can be fixed at a specific width using interior cross-members.

DETAILED DESCRIPTION OF THE EMBODIMENTS

Figure 1:
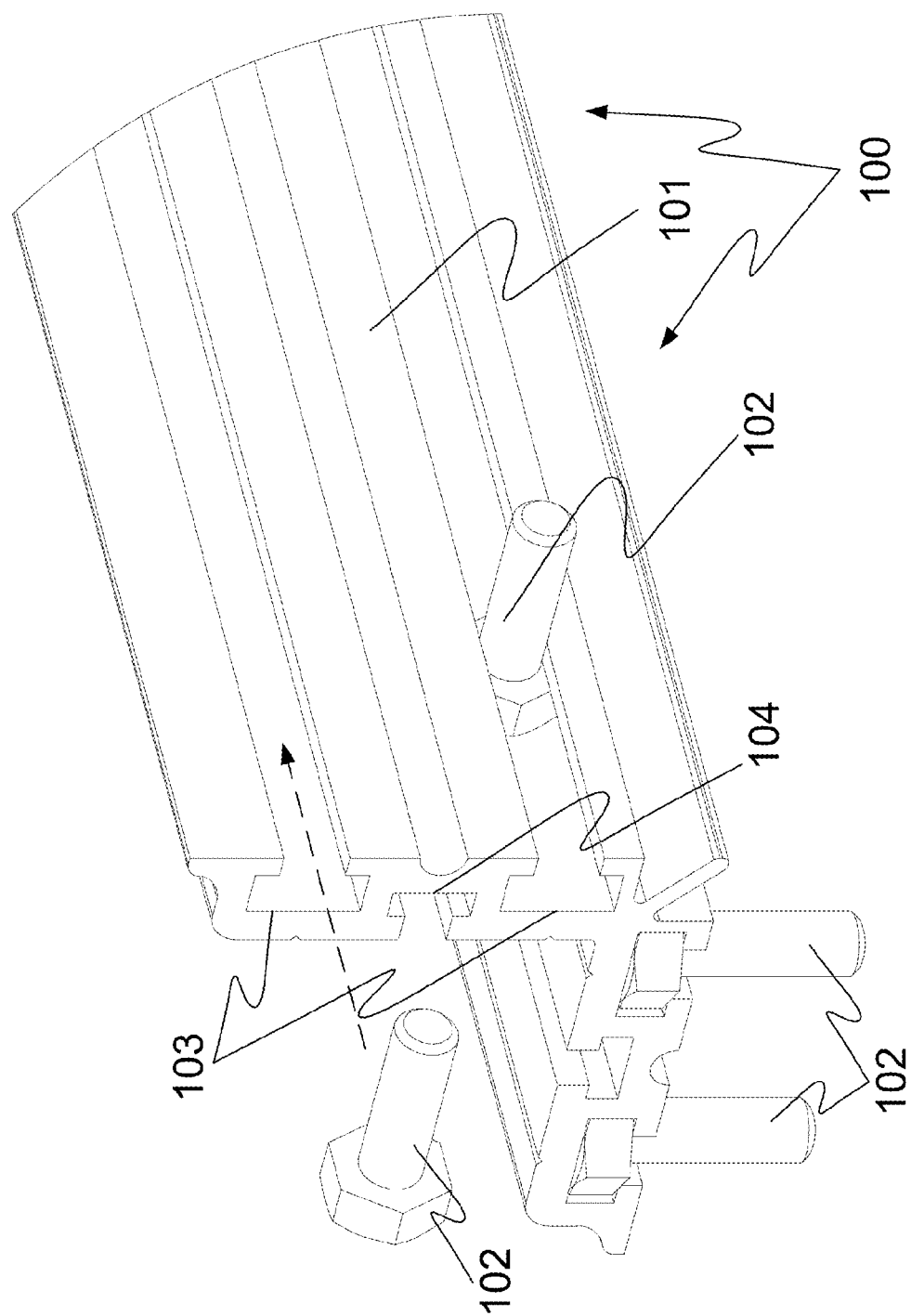
FIG. 1 is a perspective view of one embodiment of the guide rail used in the guide rail assembly. This figure also illustrates how a plurality bolts can be inserted into and arranged along the channels of the rails.

The embodiments of the Vehicle Ladder Mounting System for Custom Installations (hereinafter "Ladder Mounting System") 100 are comprised of two guide rails 101 along with one or more end accepting means 1101 and or 1201 connected to a plurality of cross-members 401. The cross-members 401 are pre-existing on the vehicle or provided by the user. A rail 101 is broadly defined as a long, narrow member that can be fabricated with a variety of cross sections and from a variety of metallic materials. In a preferred embodiment, the guide rails 101 are manufactured of aluminum. In a preferred embodiment, the rail 101 is comprised of an "L" shaped cross-section. The two interior surfaces of the "L" shaped cross-section form a right or ninety degree (90°) angle. The two exterior surfaces of the "L" shape form a reflex angle of two-hundred and seventy degrees (270°). See FIGS. 1, 2, and 3.

In another preferred embodiment of the Ladder Mounting System, each exterior surface forms "T" shaped bolt sub-channels 103 (see FIG. 1) for a total see FIG. 2). This preferred embodiment is termed the guide rail 103. The guide rail embodiment allows for flexibility in constructing the Ladder Mounting System specific to the user's needs. By sliding bolts 102 along the channels (see FIG. 1) the location of the bolts 102 along the channels can be adjusted and unique, custom configurations of guide rail assemblies can be formed. The guide rail embodiment also allows for different mounting options for adding onto ladder racks from other manufacturers and for user-supplied supports.

In a preferred embodiment of the Ladder Mounting System, the guide rail 101 is comprised of smaller sub-channels that run the length of the guide rail. The two interior surfaces each form a small "T" shaped sub-channel 104 that runs the length of the guide rail. See FIG. 1. The exterior surfaces each form "T" shaped bolt sub-channels 103 that run the length of the guide rail. See FIG. 1. The interior walls of the guide rail 101, or those walls that form a right angle, are smooth and rigid to aid the smooth loading of a ladder onto the embodiments of the Ladder Mounting System.

In another preferred embodiment of the Ladder Mounting System, the small "T" shaped sub-channel 104 that runs the length of the rail can accept corresponding slots, grooves or channels of accessories including, but not limited to, a polymeric slip pad.

The "T" shaped bolt sub-channels 103 that run the length of the guide rail can accept the head of a bolt. The bolt may slide along the length of the guide rail in the "T" shaped bolt sub-channels. The head of the bolt is incapable of being removed from the square channel except at the ends of the square channels located at the end of the guide rails. See FIGS. 1 and 2. The "T" shaped bolt sub-channels 103 can accept the head of a bolt by sliding the bolt head from either end of the channel. Most importantly, the "T" shaped bolt sub-channels 103 do not allow the bolt to turn as the width of the channel is only slightly larger than the size of the bolt to allow the bolt to slide along the length of the guide rail 101, but not allow the bolt to turn. The "T" shaped bolt sub-channels 103 do not allow the bolt head to move perpendicularly to the aluminum channel as the bolt head is restrained by small channel.

Other embodiments of the Ladder Mounting System are comprised of a guide rail assembly that can be mounted to a tubular or solid cross-member 401 by means of clamping using such as the universal mounting clamps 402. The universal mounting clamps 402 can be affixed to a cross-member 401 with a wide variety of cross-sectional shapes. See FIG. 8.

In addition, other embodiments of the Ladder Mounting System are comprised of fasteners connecting through the guide rails directly to the cross-member 401. A rail 101 can be secured to any object 203, including cross-members 401 that are user supplied, that can accept a bolt through the object. As illustrated in FIG. 2, bolts 201 can be inserted into channels at appropriate location and affixed to the object to which the guide rail is to be secured. The bolts are then passed through the holes in the object 203 and secured with nuts 202.

Other embodiments of the Ladder Mounting System 100 are comprised of one or more interior cross-members 1701 and one or more longitudinal members 1702. The interior cross-members 1701 and the longitudinal members 1702 are capable of accepting non-slip pads. The interior cross-members 1701 extend horizontally from one rail to the other rail anywhere in the middle of the rail assembly. The longitudinal members 1702 extend from one interior cross-members 1701 to another interior cross-members 1701. The combination of two interior cross-members 1701 and at least one longitudinal members 1702 create a basket for accepting ladders preventing the ladder from falling through embodiments of the Ladder Mounting System. In addition, interior cross-members 1701 provide extra lateral support for embodiments of the Ladder Mounting System.

Other embodiments of the Ladder Mounting System 100 comprise an end accepting means. The end accepting means is any device that allows for easy insertion and removal of a ladder into and from the embodiments of the Ladder Mounting System. An end accepting means includes a roller end cap 1101. See FIG. 9A and FIG. 9B. An end accepting means also includes an aluminum and/or polymeric end cap 1201. See FIG. 10A and FIG. 10B. Both the roller end cap 1101 and the polymeric end cap 1201. Rollers 1201 can be added to the channels 101 in a manner similar to accessories. Bolts 102 are positioned at the appropriate location along the square or rectangular channels formed by the guide rail, typically at the end of the guide rail 101 for installation of a roller 1201. The bolts 102 are inserted through holes in the roller 1201, and the bolts are secured by nuts 202. The rollers 1201 permit easy load-on and load-off of the ladders onto the ladder rack system 100.

Polymeric slip pads 301 may be installed onto the channels 101 at locations that aid the loading of ladders. The polymeric slip pads 301 form channels and grooves that accept the appropriate channel and grooves on the guide rails. See FIG. 11. The polymeric slip pads 301 may be installed onto a channel 101 and accept the channels and ridges on the channel 101. The polymeric slip pads can be inserted onto a channel 101 and provide a non-stick surface that allows ladders to more easily slide along the channels 101.

The Ladder Mount System 100 can be secured to preexisting or add-on roof rack, luggage rack, ladder rack or any type rack. The Ladder Mounting System 100 can be mounted to a tubular or solid cross-member 401 by means of a clamping means or fastening means through the cross-member 401 using a universal mounting clamp. The Ladder Mounting System 100 is comprised of an end-accepting means 403. The end-accepting means 403 includes an adjustable or fixed roller or loading pad that extends from one rail to the other rail and allows for easier loading or unloading of the ladder.

Other embodiments of the Ladder Mounting System 100 are comprised of adjustable guide rails that make up the Ladder Mounting System that can be adjusted in width apart from each other which allows for storage of different sizes of ladders.

Other embodiments of the Ladder Mounting System 100 are comprised of guide rails that make up the Ladder Mounting System can be adjusted from parallel to nearly parallel (angled) to fit the sloped sides of a step ladder.

Other embodiments of the Ladder Mounting System 100 are comprised of an interior cross-member 1701 capable of accepting non-slip pads and extending horizontally from one rail to the other rail anywhere in the middle of the guide rails which would affix the guide rails creating a cradle for accepting ladders and where the guide rails could be either parallel or nearly parallel (angled).

Other embodiments of the Ladder Mounting System 100 are of polymeric cross-member pads 1801 that clip over an interior cross-member 1701 help for an interior piece that will help cradle the ladder. The vehicle ladder mounting system described are comprised of an aluminum and/or polymeric edge guard 1401 that can be attached to the ends of the guide rails that helps guide the ladder along the guide rails and protects from interference between the ends of the guide rails and the ladder. In other embodiments of the Ladder Mounting System 100 all components except fasteners are manufactured from polymeric materials, reinforced polymeric materials, or composite polymeric materials.

I claim:

1. A vehicle ladder mounting system comprised of
   a. a preexisting luggage rack or ladder rack on which the vehicle ladder mounting system is attached:
   b. one or more end accepting means of roller end cap or a loading pads,
   c. two or more polymeric slip pads;
   d. a plurality of universal mounting clamps affixed to a pre-existing cross-member of the preexisting luggage rack or ladder rack and having a wide variety of cross-sectional shapes;
   e. two guide rails wherein the guide rails are comprised of an "L" shaped cross-section with "T" shaped bolt sub-channels; and wherein interior surfaces of the "L" shaped cross-sections form a right ninety-degree (90°) angle; and wherein exterior surfaces of the "L" shape cross-sections form a reflex angle of two- hundred and seventy degrees (270°);
   f. wherein the plurality of universal mounting clamps can be adjusted to accommodate various widths of ladders by adjusting the guide rails closer together or further apart;
   g. a plurality of interior cross-members accepting the polymeric slip pads and extending horizontally from one guide rail to the other guide rail in the middle of the guide rails and affix to the guide rails and creating a basket for accepting ladders and where the guide rails could be either parallel or nearly parallel; and
   h. wherein the interior cross-member is slotted to accept a bolt head.

2. A vehicle ladder mounting system comprised of
   a. a preexisting luggage rack or ladder rack on which the vehicle ladder mounting system is attached:
   b. one or more end accepting means of roller end cap or a loading pads,
   c. two or more polymeric slip pads;
   d. a plurality of universal mounting clamps affixed to a pre-existing cross-member of the preexisting luggage rack or ladder rack and having a wide variety of cross-sectional shapes;
   e. two guide rails wherein the guide rails are comprised of an "L" shaped cross-section with "T" shaped bolt sub-channels; and wherein interior surfaces of the "L" shaped cross-sections form a right ninety-degree (90°) angle; and wherein exterior surfaces of the "L" shape cross-sections form a reflex angle of two- hundred and seventy degrees (270°);

f. wherein the plurality of universal mounting clamps can be adjusted to accommodate various widths of ladders by adjusting the guide rails closer together or further apart;
g. a plurality of interior cross-members accepting the polymeric slip pads and extending horizontally from one guide rail to the other guide rail in the middle of the guide rails and affix to the guide rails and creating a basket for accepting ladders and where the guide rails could be either parallel or nearly parallel; and
h. an aluminum or polymeric edge guard attached to the ends of the guide rails that helps guide the ladder into and along the guide rail assembly and protects from interference between the ends of the guide rail and the ladder.

* * * * *